United States Patent [19]

Spears

[11] Patent Number: 5,653,493

[45] Date of Patent: Aug. 5, 1997

[54] FAIRING SHELL ASSEMBLY HAVING PLANAR SURFACES THEREON

[76] Inventor: Dan E. Spears, 3515 Westfield Dr., Brandon, Fla. 33511

[21] Appl. No.: 659,079

[22] Filed: Jun. 3, 1996

Related U.S. Application Data

[63] Continuation-in-part of Ser. No. 351,800, Dec. 8, 1994, Pat. No. 5,522,637, Ser. No. 351,831, Dec. 8, 1994, Pat. No. 5,536,062, and Ser. No. 352,515, Dec. 9, 1994, Pat. No. 5,595,419.

[51] Int. Cl.$^6$ .................................................. B62D 35/00
[52] U.S. Cl. .................................. 296/180.2; 296/180.5
[58] Field of Search .......................... 296/180.1–180.5; 180/903

[56] References Cited

U.S. PATENT DOCUMENTS

| | | | |
|---|---|---|---|
| 4,102,548 | 7/1978 | Kangas | 296/180.3 |
| 4,199,185 | 4/1980 | Woolcock | 296/180.2 |
| 4,375,898 | 3/1983 | Stephens | 296/180.3 |
| 4,693,506 | 9/1987 | Massengill | 296/180.3 |
| 4,919,472 | 4/1990 | Wiley, Jr. | 296/180.3 X |
| 5,092,648 | 3/1992 | Spears | 296/180.3 |
| 5,317,880 | 6/1994 | Spears | 296/180.3 X |

FOREIGN PATENT DOCUMENTS

| | | | |
|---|---|---|---|
| 2806370 | 3/1979 | Germany | 296/180.3 |
| 3003565 | 8/1981 | Germany | 296/180.5 |

Primary Examiner—Dennis H. Pedder

[57] ABSTRACT

The disclosure explains shell assemblies, doors and resultant fairings having air flow redirection capabilities. Planar surfaces, with either linear juncture or curved transition surfaces therebetween, are provided to condition the air flow. These adjacent, although not necessarily contacting, planar surface areas produce a reduction in turbulent wash within the air flow, and therefore greater control thereover, by providing angular changes between adjacent surface areas. Redirection of air flow to provide for any of several useful purposes are explained, including variable redirection wherein a portion of the available air flow is redirected. Wing members, with either fixed or variable angles of attack, provide for the further conditioning of the air flow. Linear alignment of surfaces on the shell assembly with surfaces on the doors provide for stable air flow along the fairing.

15 Claims, 7 Drawing Sheets

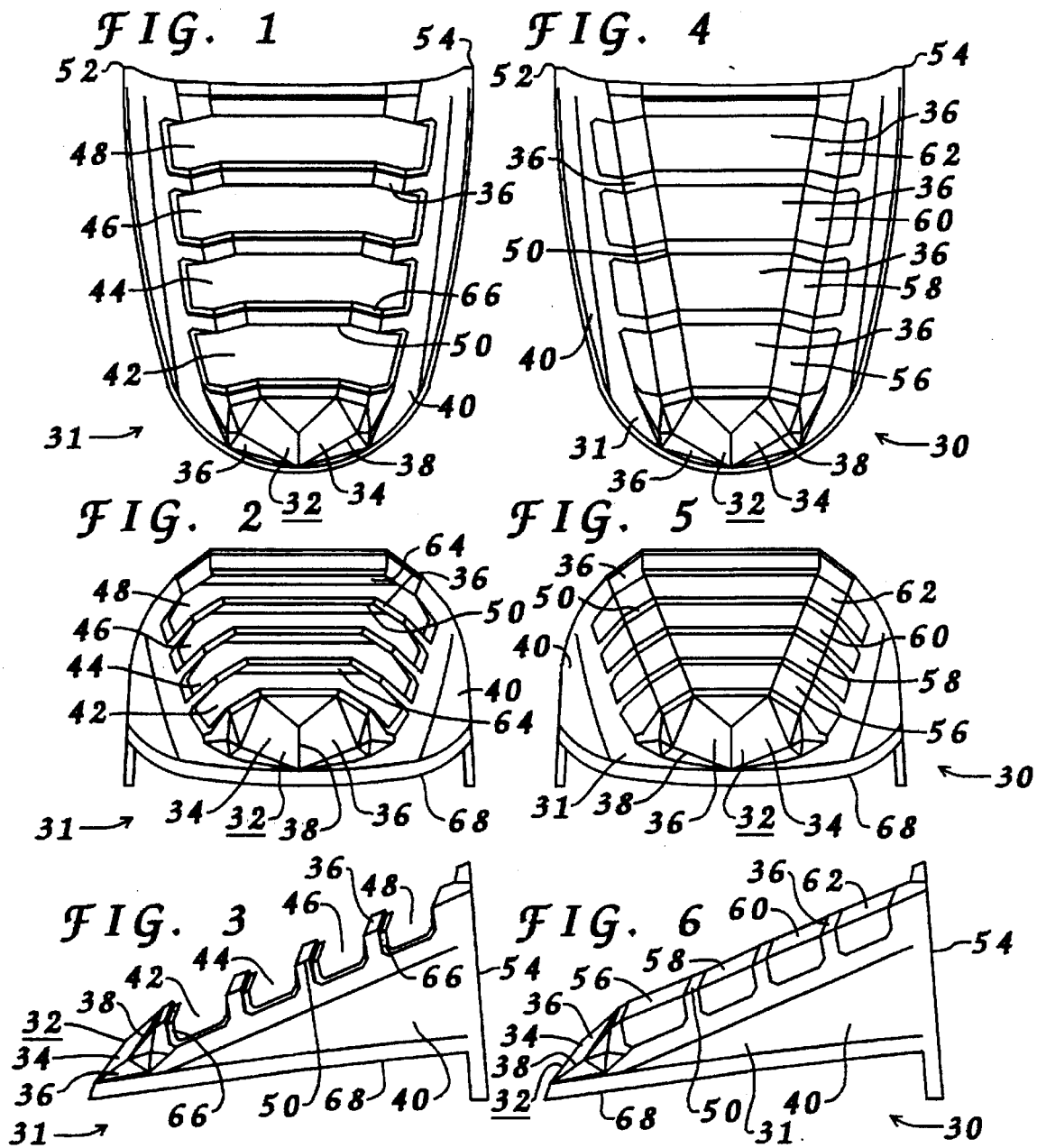

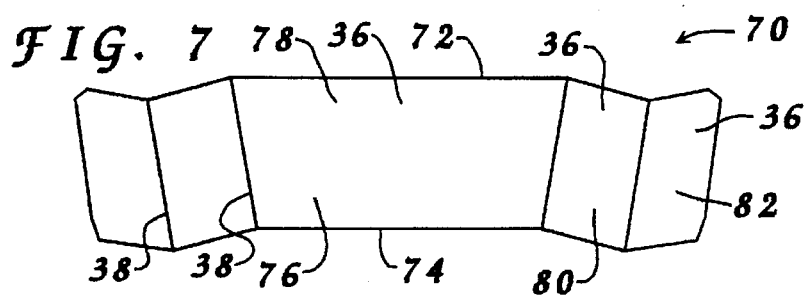
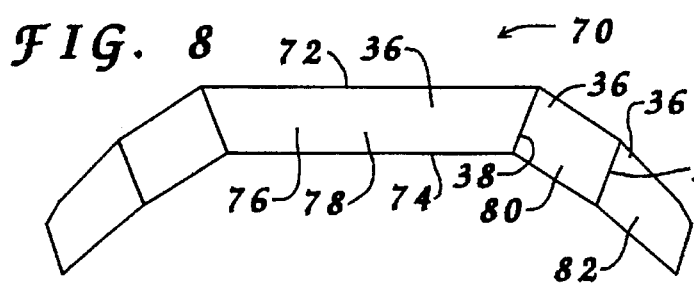
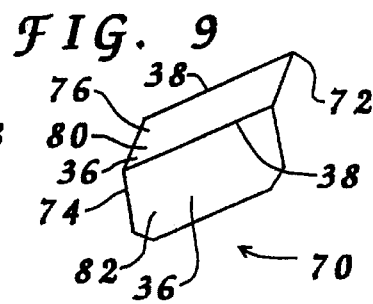
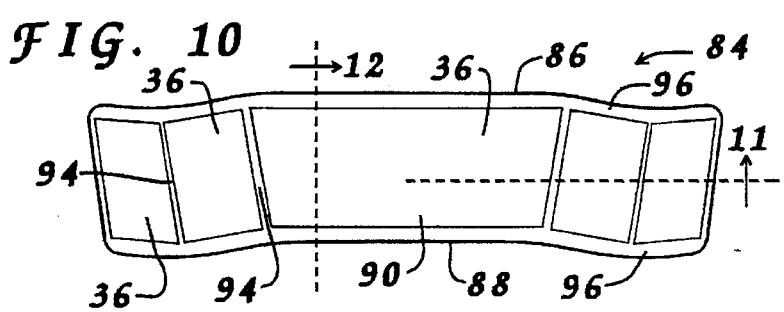
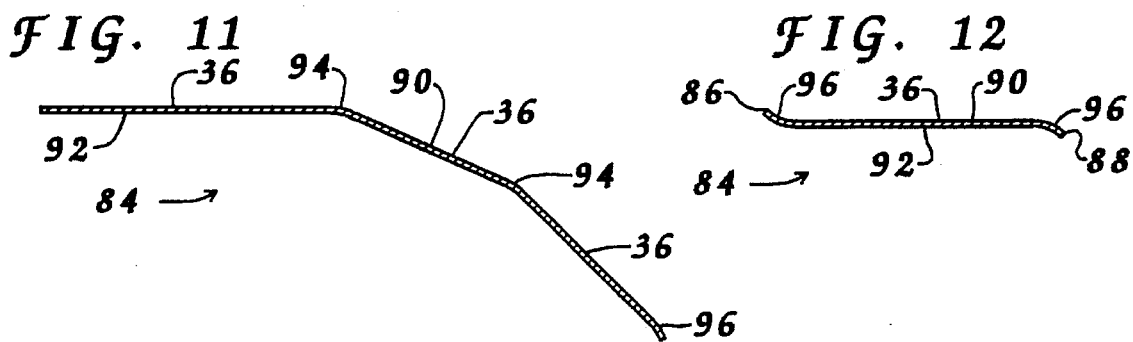

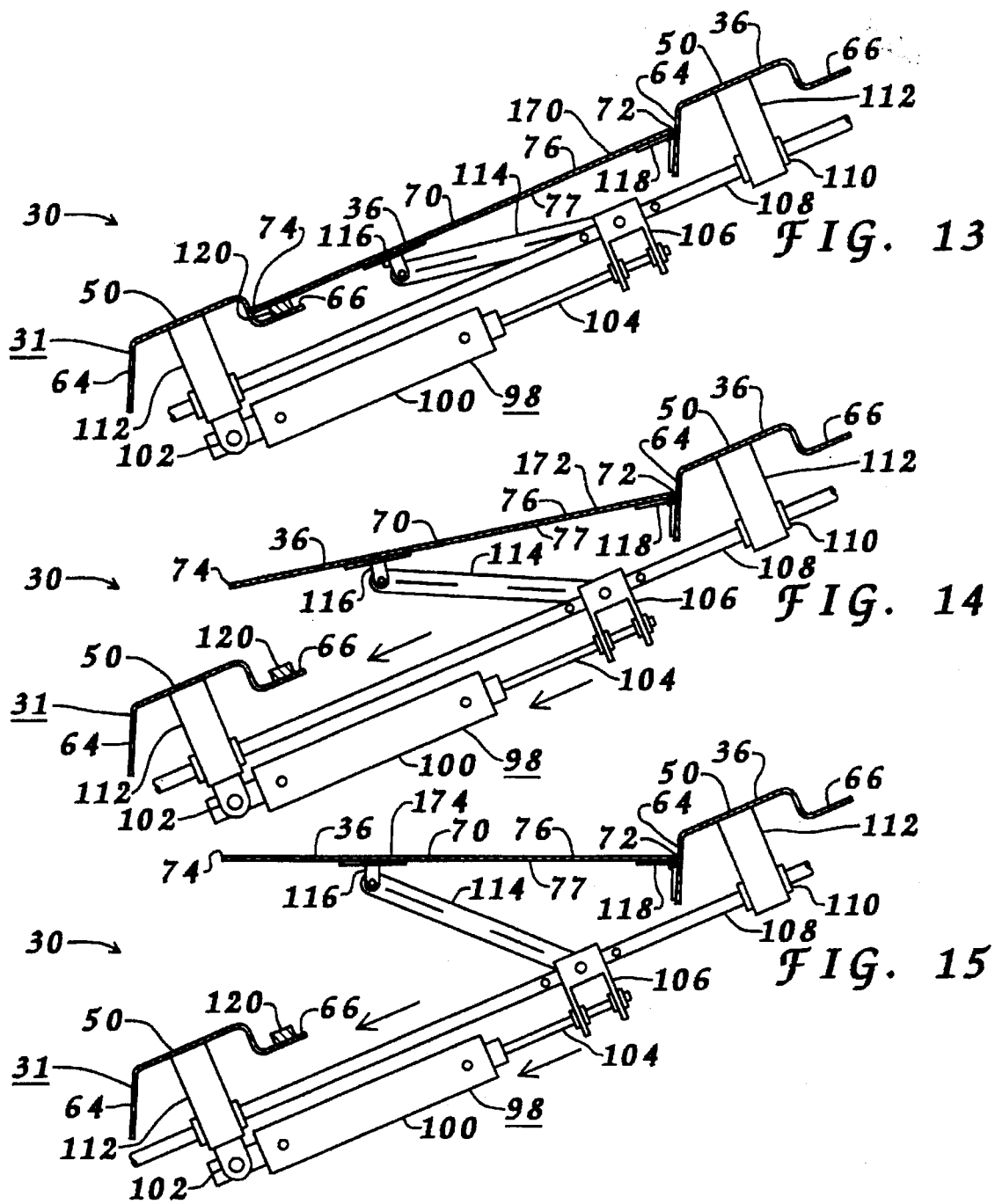

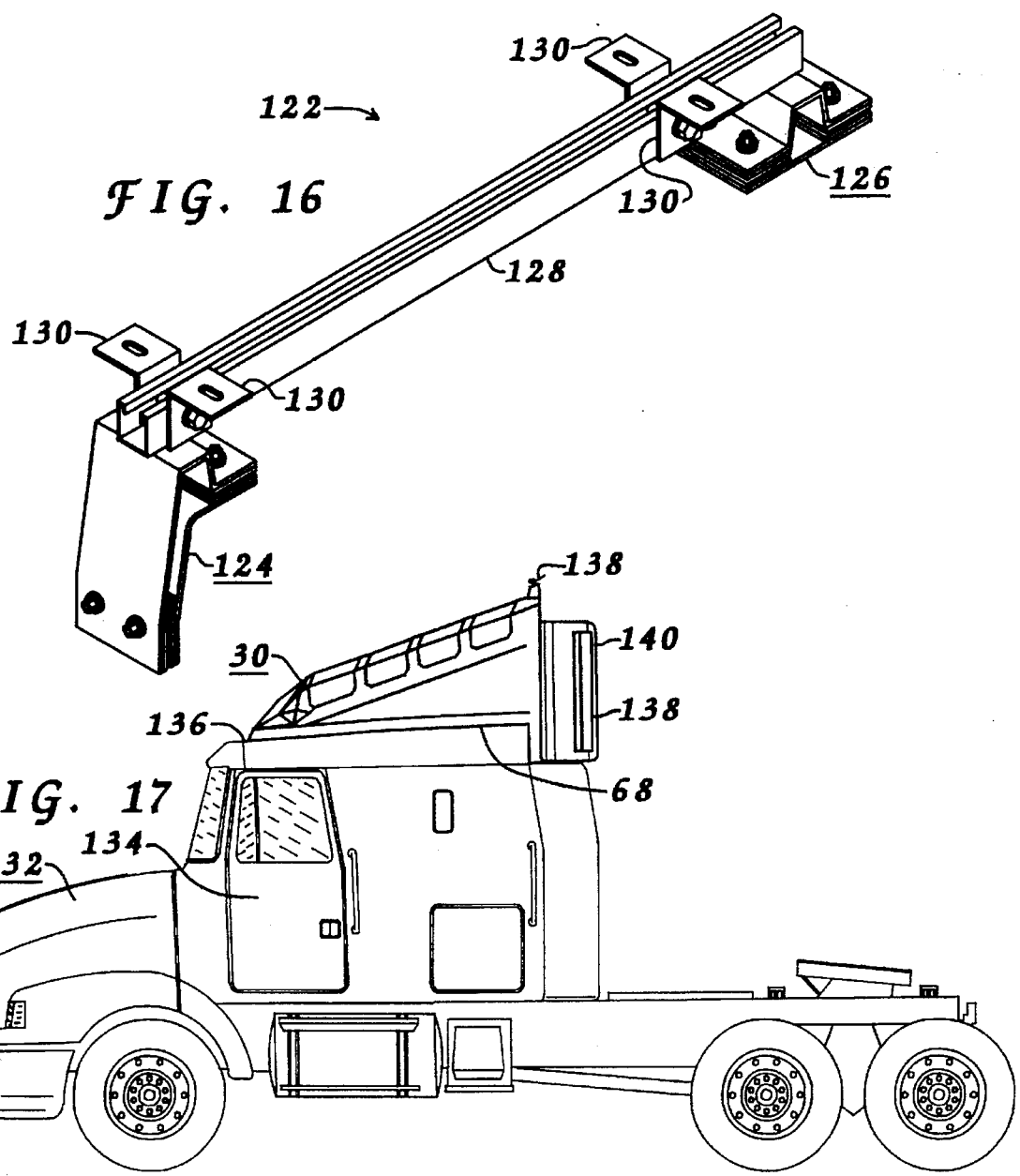

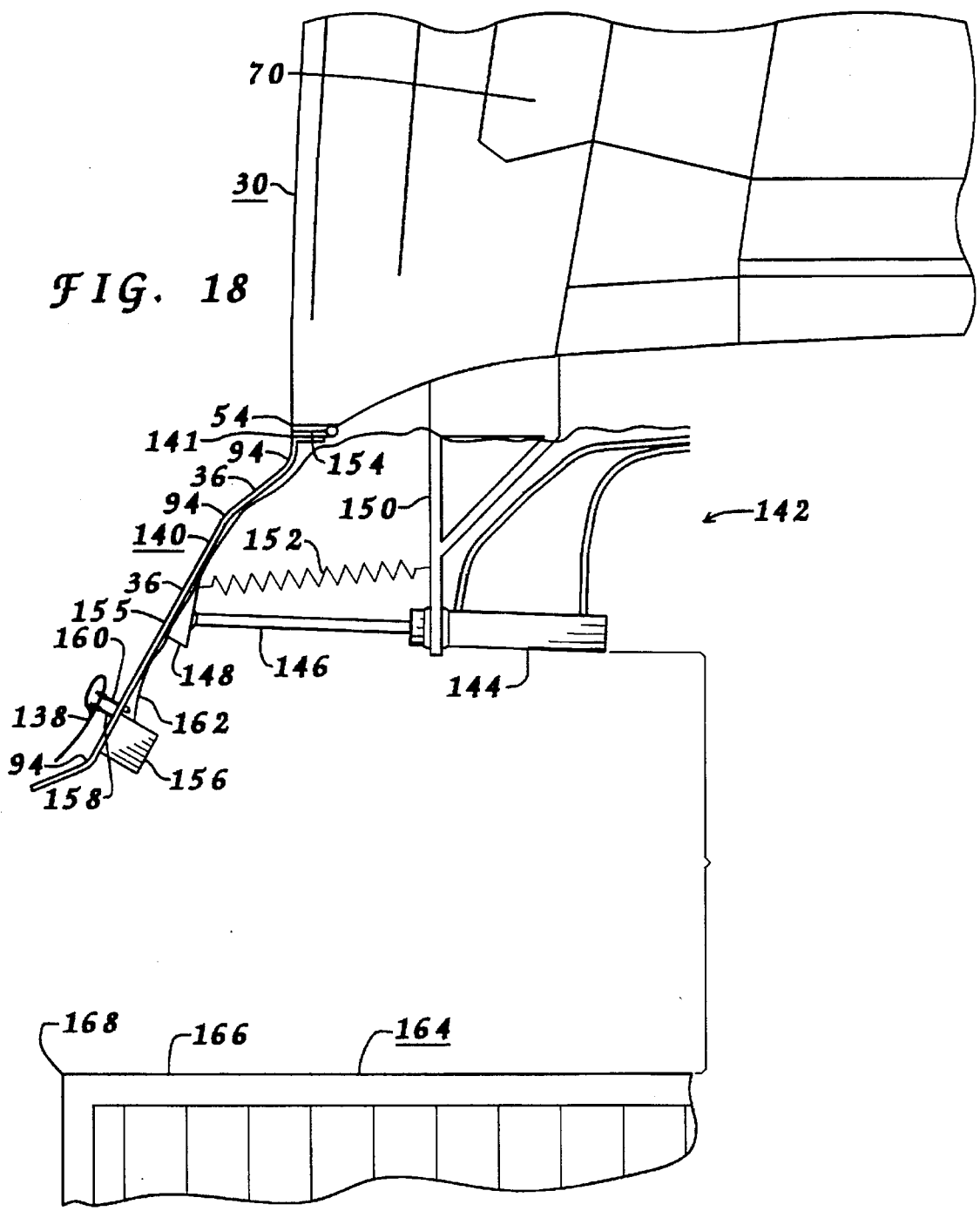

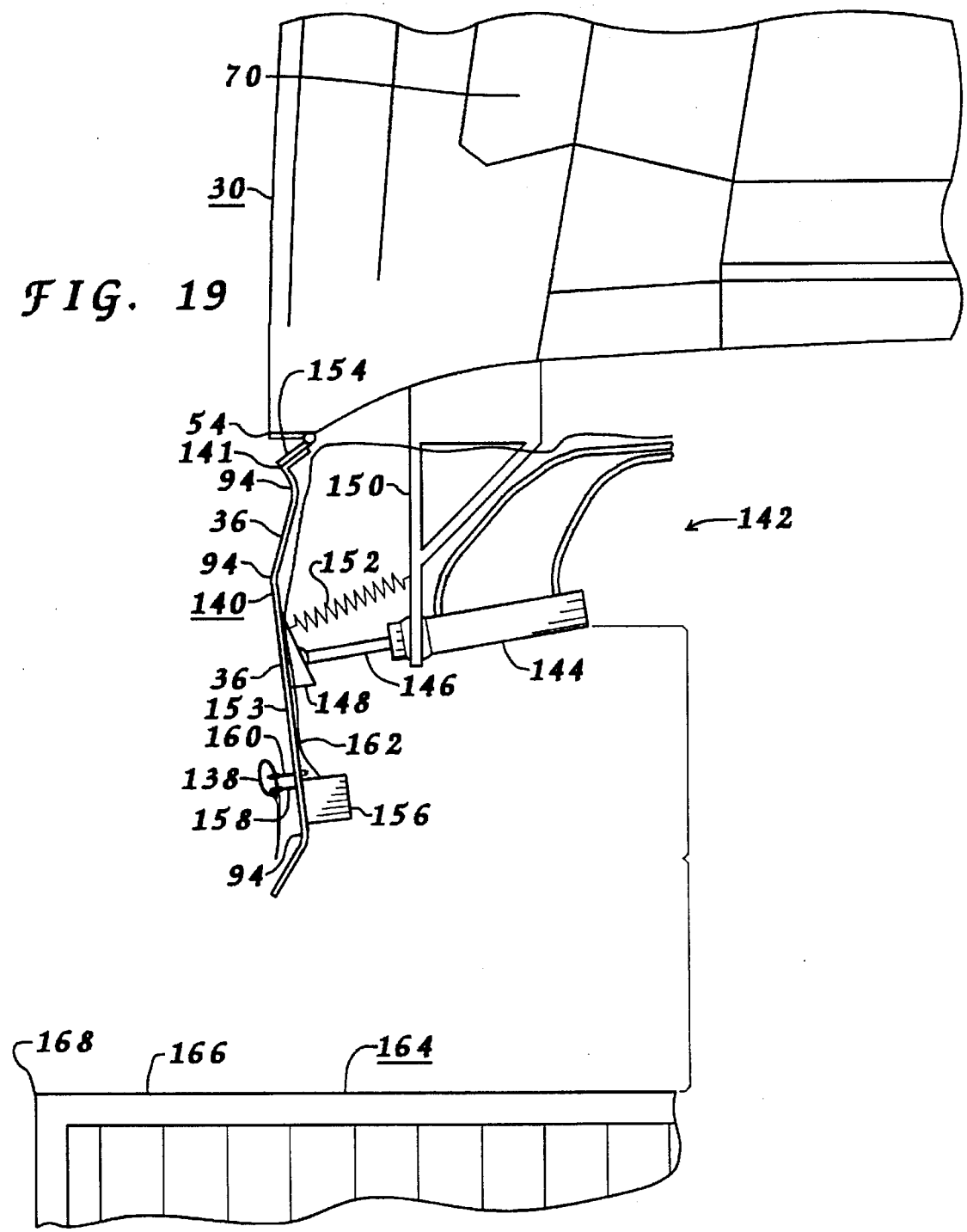

FAIRING SHELL ASSEMBLY HAVING PLANAR SURFACES THEREON

CROSS-REFERENCES

This application is a continuation-in-part application of: 1) U.S. patent application Ser. No. 08/351,800, filed Dec. 8, 1994 and entitled "Auxiliary Braking Panels for a Tractor Trailer Combination", U.S. Pat. No. 5,522,637, 2) U.S. patent application Ser. No. 08/351,831, filed Dec. 8, 1994 and entitled "Cross Wind Conditioning for a Tractor Trailer Combination", U.S. Pat. No. 5,536,062, 3) U.S. patent application Ser. No. 08/352,515, filed Dec. 9, 1994 and entitled "Segmented Air Deflector Assembly", U.S. Pat. No. 5,595,419. All of these applications are incorporated herein by this reference.

BACKGROUND

1. Field of the Invention

Generally, the invention relates to providing aerodynamic reduction of drag in cooperation with selective redirection of air flow to tractor trailer assemblies. More specifically, the invention relates to the use of a shell assembly having at least two movable door panels mounted therein, with each of the door panels having planar surfaces thereon, to achieve these goals.

2. Description of the Prior Art

Tractor trailer combinations are plentiful along highways and are utilized to transport vast quantities of materials and goods. The tractor contains a motor, generally diesel fueled, which in turn provides the power which enables the tractor trailer combination to be propelled along a desired path. The trailer provides storage space to house materials and goods.

Contemporary fairings provide for a smoothing of the outline of the tractor trailer unit to reduce drag. Generally, fairings are comprised of a single shell constructed of either fiberglass or a metal alloy and attached to the top of the roof of the tractor. These units are usually specifically designed to be installed on a particular model of tractor.

Various attempts have been made to provide fairings with air redirection capabilities to cause the air flow, from the forward movement of the tractor trailer combination, to selectively impinge the forward face of the trailer to exert a braking force. These attempts have been less efficient than desired. Applicant's prior U.S. Pat. No. 5,092,648, succeeded in addressing the issue of redirection to exert a braking force.

Your applicant is unaware of any prior usage which has addressed the turbulent wash of disturbed air flowing over and past the forward surfaces of the vehicle's fenders, hood or windshield. As such, it may be appreciated that there continues to be a need for a shell based fairing capable of streamlining air flow while conditioning that air flow to reduce turbulence therein, and therefore make the resultant air flow more controllable, while providing for selective air flow redirection. The present invention substantially fulfills these needs. Your applicant is unaware of the use of plural planar surfaces in a fairing design other than his own.

SUMMARY

In view of the foregoing disadvantages inherent in the known types of fairings your applicant has developed a fairing having a shell assembly with a plurality of openings therein. Each of these openings receives a door panel having a plurality of exterior planar surface areas thereon. These planar surface areas either contact adjacent planar surface areas with a linear juncture or have curved transition surfaces therebetween. Each door panel is hingedly mounted within the opening and is displaceable therein to alternatively close the opening or expose the opening. The shell assembly is mountable to a roof of a tractor where the fairing, comprising the shell assembly with the door panels mounted therein, selective acts to streamline air flow or redirect the air flow.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a fairing comprising a shell assembly with moveable door panels mounted therein, wherein large surface areas of the exterior of the fairing are comprised of planar surfaces.

Other object include;

a) to provide for planar surfaces separated by a linear juncture.

b) to provide for curved transitions between adjacent planar surfaces wherein the adjacent planar surfaces occupy distinct planes of projection.

c) to provide for curved transitions on panels between planar surfaces and the edge of the panel.

d) to provide for door panels having a plurality of planar surfaces occupying distinct planes of projection.

e) to provide for a one piece molded shell assembly having planar surfaces thereon.

f) to provide for cooperation between the planar surfaces of the shell assembly and the planar surfaces of the door panels when the door panels are in a closed position.

g) to provide for moveable door panels which may be displaced to expose an opening in the shell assembly for the redirection of air flow.

h) to provide for selective displacement of select door panels to redirect a select amount of air flow dependant upon usage.

i) to provide for a nose assembly to be formed of a plurality of planar surfaces with linear juncture separating adjacent surfaces thereon.

j) to provide for opposing side extenders to cooperate with the fairing to selectively redirect air flow around a trailer.

k) to provide for displacement means to alter the position of select side extenders to redirect the air flow.

l) to provide for cross braces on the shell assembly having panel mounting surfaces and door seating surfaces thereon.

m) to provide for a wing member to further condition the air flow for any of the several purposes of the invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 1 is an overhead plan view of a shell assembly.

FIG. 2 is a front plan view of the shell assembly shown in FIG. 1.

FIG. 3 is a side plan view of the shell assembly shown in FIG. 1 and FIG. 2.

FIG. 4 is an overhead plan view of a fairing.

FIG. 5 is a front plan view of the fairing shown in FIG. 4.

FIG. 6 is a side plan view of the fairing shown in FIG. 4 and FIG. 5.

FIG. 7 is an overhead plan view of a door panel.

FIG. 8 is a front plan view of the door panel shown in FIG. 7.

FIG. 9 is a side plan view of the door panel shown in FIG. 7 and FIG. 8.

FIG. 10 is an overhead plan view of a second embodiment of a door panel.

FIG. 11 is an enlarged sectional plan view as taken from the section line '11' shown in FIG. 10.

FIG. 12 is an enlarged sectional plan view as taken from the section line '12' shown in FIG. 10.

FIG. 13 through FIG. 15 are sectional plan views of a drive assembly with a door panel shown in various alternative positions.

FIG. 16 is a perspective view of a bracket assembly.

FIG. 17 is a side plan view of a tractor with a fairing installed thereon.

FIG. 18 and FIG. 19 are overhead plan views of a side extender, shown in alternative positions, attached to the fairing.

DESCRIPTION

Figure 20:
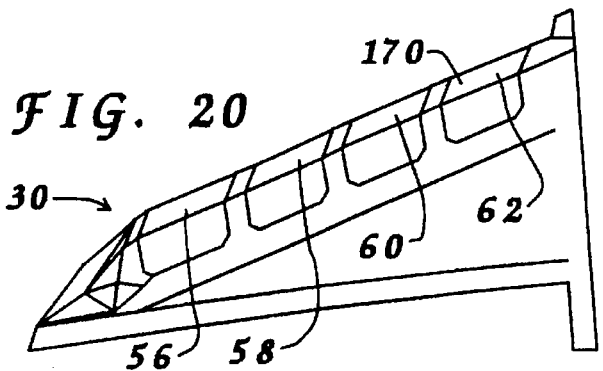
FIG. 20 through FIG. 23 are side plan views of the fairing shown in alternative positions.

Reference is now made to the drawings where like reference numerals refer to like parts throughout the various views.

Overview

There are two principle results obtainable from use of fairings having features of the present invention. The first result is to streamline air flow during forward motion of a combination of a tractor and a trailer to reduce drag and therefore decrease fuel consumption. The second result is to provide for selective redirection of the air flow for any of several useful purposes. These purposes include increasing drag to provide for a slowing of the combination, compensate for cross wind conditions to reduce their effects, ventilate and cool refrigeration units and cool brake components.

Shell assembly

The shell assembly may be of a one piece molded construction or assembled from several molded sections. Various surface sections must exist on the shell assembly including traversal separation by at least two, (2), planar sections which may traverse the displaceable doors. Openings must exist to permit air flow passage therethrough with displaceable doors sealing these openings while in their respective closed positions.

Referring specifically to FIG. 1 through FIG. 3, a shell assembly 31 is disclosed having an exterior comprising a combination of planar surfaces 36 and curved surfaces 40. A lower edge 68 extends around a lower perimeter and is adaptable for attachment to a tractor 132, shown in FIG. 17. While various numbers of openings are possible, shell assembly 31 has a series of four, (4), openings comprising a first door opening 42, a second door opening 44, a third door opening 46 and a fourth door opening 48, traversing laterally thereon. As clearly shown in FIG. 2, these door openings, 42, 44, 46 and 48 provide for passage therethrough of air flow.

A cross brace 50 separates each door opening 42, 44, 46 and 48 from any adjacent door openings 42, 44, 46 and 48. Each cross brace 50 is separated into a plurality of planar surfaces 36 which cooperate with other surfaces to form the exterior of a fairing 30. Each cross brace 50 also has a hinge mounting surface 64 disposed within a respective door opening 42, 44 or 46 at the forward side and a group of door seating surfaces 66 disposed within a respective door opening 44, 46 or 48 around at least part of the perimeter thereof. Shell assembly 31 further has one, (1), hinge mounting surface 64 rearward of fourth door opening 48 and a group of door seating surfaces 66 at least partially surrounding first door opening 42. Thus, each door opening 42, 44, 46 and 48 has disposed at the rearward side one, (1), hinge mounting surface 64 and a group of door seating surfaces 66 at least partially surround the remaining perimeter thereof.

A nose section 32 is comprised of a plurality of planar surfaces 36 represented by nose surfaces 34. Each nose surface 34 is separated from adjacent nose surfaces 34 by a linear juncture 38. As air flows along each planar surface 36 and passes over linear juncture 38 it attempts to conform to the next planar surface 36 which it encounters. This action, when combined with similarly actions occurring due to passage of the air flow across the other surface areas of the shell assembly and doors, tends to reduce the turbulent wash within the air flow created by prior contact with forward surfaces on the tractor. This reduction in turbulent wash extends outward in the air flow from fairing 30 and conditions the entire air flow as it subsequently passes a trailer 164, shown in FIG. 18 and FIG. 19.

Shell assembly 31 has a right rear edge 52 and a left rear edge 54 which permit the optional installation of side extenders 140, shown in FIG. 17 through FIG. 19, and more particularly disclosed below.

While a one piece shell assembly 31 is disclosed, fabrication in sections is possible with assembly taking place prior to, or during, installation. Preferably, shell assembly 31 is formed of any suitable material in a molding operation with sufficient reinforcement to ensure adequate strength during usage. While distinct molds are possible for distinct models of tractors, a single mold may be used to fabricate a shell assembly adaptable for installation on numerous models of tractors. Adaptation of lower perimeter closing members provide for such installations without unacceptable air passage between the lower perimeter of the fairing and the roof of the tractor.

Door panel

Each door panel must have at least two, (2), surfaces which occupy distinct planes of projection. While curved surfaces may exist on each door, at least two, (2), separate and distinct surfaces must be planar. Preferably, these surfaces align with exposed surfaces on the shell assembly while the doors are in their respective closed positions.

Referring now Specifically to FIG. 7 through FIG. 9, a door 70 is shown having an outer surface 76 which comprises a center panel 78, opposing intermediate side panels 80 and opposing outer side panels 82. Each of these panels 78, 80 and 82 are comprised of planar surface 36 which is separated from adjacent panels 78, 80 and 82 by linear juncture 38. Each of these panels 78, 80 and 82 extend to opposing upper edge 72 and lower edge 74. Each intermediate side panel 80 is downturned angularly from center panel 78. Each outer side panel 82 is downturned angularly from the respective intermediate side panel 80. Door 70, being representative of a first door 56, a second door 58, a third door 60 and a fourth door 62, shown in FIG. 4 through FIG. 6 and FIG. 20 through FIG. 23, is formable in a molding process of any suitable material.

Alternatively, a door 84 is disclosed in FIG. 10 through FIG. 12. Within this embodiment of the instant invention curved surfaces may be selectively deployed around the outer perimeter of door 84 or between adjacent planar surfaces 36. Each distinct planar surface 36 is separated from adjacent planar surfaces 36 by a curved transition surface 94, as clearly shown in FIG. 11. Each distinct planar surface 36 is separated from adjacent perimeter by a curved surface 96. FIG. 12 shows curved surface 96 disposed between planar surface 36 and an upper edge 86. Similarly, curved surface 96 is disposed between planar surface 36 and a lower edge 88. Planar surface 36 cooperates with curved transition surfaces 94 and curved surfaces 96 to form an outer surface 90, which in use, forms part of the exterior of the fairing deployed on. The opposing surface to outer surface 90 forms an inner surface 92.

With any of the embodiments of the door panels, reinforcing structures may be employed on either the outer surface or the inner surface to strengthen the door panel. Such reinforcing structures may extend within an area corresponding to a single surface area or may extend between areas corresponding to multiple surface areas.

Fairing

The resultant fairing must be capable of providing superior control over the air flow to reduce turbulent wash therein while providing for selective redirection of the air flow. Various planar surfaces, both on the doors and on the exposed surfaces of the shell assembly, cooperate to provide this control.

Referring how specifically to FIG. 4 through FIG. 6, fairing 30 is comprised of doors 56, 58, 60 and 62 mounted within shell assembly 31. The various planar surfaces 36 of doors 56, 58, 60 and 62 cooperate with the various adjacent planar surfaces 36 of shell assembly 31 generally, and cross braces 50 specifically, to define linear alignment to condition the air flow for better control thereover.

Door panel displacement

Various structures may be employed to provide for displacement of the doors to expose the respective openings within the fairing. Once the openings within the fairing are exposed it is preferred that the respective doors funnel the air flow into their respective openings.

Referring now specifically to FIG. 13 through FIG. 15, door 70, also shown in FIG. 7 through FIG. 9, is shown mounted in shell assembly 31, also shown in FIG. 1 through FIG. 3. Two, (2), cross braces 50 are shown with door 70 mounted therebetween. Each cross brace 50 has hinge mounting surface 64 disposed thereforward and door seating surface 66 disposed thererearward. Door 70 is mounted adjacent upper edge 72 to hinge mounting surface 64 using a hinge 118. A seating strip 120 is fixed to door seating surface 66 to contact and dampen impact and vibration with door 70 adjacent lower edge 74 on an inner surface 77.

A drive assembly 98 selectively acts to move door 70 between a closed position 170, shown in FIG. 13, a partially open position 172, shown in FIG. 14, and an open position 174, shown in FIG. 15, and any select position therebetween. A drive 100, of any convention type such as pneumatic, hydraulic or electric, has a drive rod 104 which is displaceable relative to drive 100. Drive 100 is mounted to a drive anchor member 102 which is in turn mounted to a bracket 112 which in turn is mounted to cross brace 50. A second bracket 112 is mounted to the second cross brace 50. Each bracket 112 has a slide mount 110 thereon which slidably receives a drive bar 108. A coupling 106 connects drive bar 108 to drive rod 104. Therefore, when drive 100 causes drive rod 104 to move, drive bar 108 slides between slide mounts 110. A linkage member 114 is pivotally attached at one end to drive bar 108 while pivotally attached at the opposing end to a connection bracket 116. Connection bracket 116 is rigidly attached to inner surface 77 of door 70. Therefore, drive assembly 98 may selectively cause pivotal displacement of door 70 relative to shell assembly 31.

In operation, drive assembly 98 may exert control over a single door 70, multiple doors 70 or all deployed doors 70. Such selection dependant upon the desired usage of redirected air flow and the particular configuration of fairing 30.

Mounting

The fairing will be mounted along the roof of the tractor. With conventional tractors this will be the roof of the cab. When sleepers are included within the tractor, mounting will occur to the roof of the cab, the roof of the sleeper or extend across and include mounting to both the roof of the cab and the roof of the sleeper. If instances exist that the sleeper is pivotally attached to the tractor were there exists a clear distinction between the two, mounting may occur to either with the rearward member, being the sleeper unit, being the most likely position of mounting.

Numerous methods exist to mount the fairing to the roof of the cab of the tractor. Direct bolting of the lower perimeter is possible. This method requires that the lower perimeter of the specific shell assembly match the profile of target tractor. Alternatively, generic shell assemblies many be designed which permit installation on several models of tractors using intermediate mounting rings. Specific intermediate mounting rings have an upper extent which matches the lower perimeter of the fairing and specifically designed lower perimeter designs which match specific models of tractors. Preferably, mounting brackets are deployed which permit attachment of specific shell assemblies to several tractors having similarly proportioned roofs.

FIG. 16 illustrates a bracket assembly 122, as conventionally known in the art, which when used in a pair, are capable of mounting fairing 30 to trailer 132, shown in FIG. 17. A rear bracket assembly 124 attaches to a roof 136 of a cab 134 of tractor 132 with roof 136 secured therein. A forward bracket assembly 126 attaches to roof 136 of cab 134 of tractor 132 with roof 136 secured therein. A coupling track 128 secures to rear bracket assembly 124 and forward bracket assembly 126 and spans therebetween. Various mounting brackets 130 attach to coupling bracket 128. These mounting brackets 130 then are secured to fairing 30 to secure fairing 30 to roof 136. Lower edge 68 of fairing 30 is in close proximity to roof 136 following such attachment.

Side extenders

Due to variations in dimensions of tractors, trailers and the spacing therebetween it is preferred to have separate components which may divert air flow around the sides of the trailer deployed. These components are provided in the form of side extenders which have distinct planar surfaces thereon which cooperate with the fairing to continue to condition the air flow prior to passage around the trailer. These side extenders may be displaceable to permit selective redirection of the air flow separate from the redirection caused by the displaceable doors within the fairing.

Side extender 140, shown in FIG. 17 through FIG. 19, provide for additional diversion of air flow around trailer 164 while continuing to condition the air flow to reduce turbulent wash therein. Side extender 140 mounts to left rear edge 54 of fairing 30. Similarly, a second side extender 140 mounts to right rear edge 52 of fairing 30, not shown. One tab of a hinge 154 attaches to fairing 30 in close proximity to left rear edge 54 and the opposing tab of hinge 154 attaches to side extender 140 in close proximity to a forward edge 141. The exposed side of each side extender 140 comprises a series of planar surfaces 36 separated therebetween by curved transition surfaces 94.

When mounting side extender 140 for horizontal displacement a mounting bracket 150 attaches to fairing 30 and extends rearward thereon. A drive assembly 142 comprising a drive member 144 pivotally mounted to mounting bracket 150 and a coupling bracket 148 mounted to side extender 140. A drive rod 146 is displaceable by drive member 144 and pivotally attaches to coupling bracket 148. A retraction spring 152 disposes side extender 140 in a retracted position 153, shown in FIG. 19. When in this position air flow impinges a forward face 166 of trailer 164. Drive member 144 selectively pushes side extender 140 to an extended position 155, shown in FIG. 18. When in this position air flow is diverted around a forward edge 168 of trailer 164.

Wing member

Wing members provide for additional conditioning of the air flow across and adjacent to the fairing. Wing members may be mounted adjacent any of numerous surface areas of the shell assembly, the doors and the side extenders.

FIG. 17 illustrates the usage of a wing member 138 to further condition and control air flow. Wing member 138 is shown mounted horizontally traversing fairing 30 at the upper extent. In this position control is exerted over the air flow moving along and passing over fairing 30. Wing member 138 is shown mounted vertically along side extender 140 adjacent a rear edge thereon. In this position control is exerted over the air flow moving along and passing next to fairing 30.

Wing member 138 may be adjustably mounted to the support surface. FIG. 18 and FIG. 19 illustrate one such embodiment. A drive 156 is mounted on one side of side extender 140 and is connected to control means using a wire 162. Extending from drive 156 is a drive rod 158 which penetrates side extender 140 and connects to wing member 138. A support rod 160 penetrates side extender 140 and has one end secured thereto. The opposing end is pivotally mounted to wing member 138. Thus, when drive rod 158 is displaced the angle of attack of wing member 138 is altered.

Operation

FIG. 20 through FIG. 23 illustrate various positions of operation of fairing 30. FIG. 20 shows all doors 56, 58, 60 and 62 in closed position 170. In this position fairing 30 acts as a fairing and redirects air flow to reduce drag. It being understood that due to the surface configurations of various surface panels air flow is conditioned during passage over fairing 30 to reduce turbulent wash and increase control over the air flow.

Figure 21:
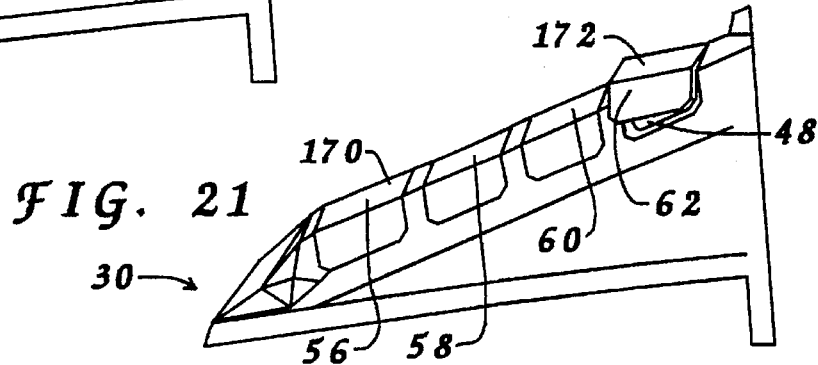

FIG. 21 shows doors 56, 58 and 60 in closed position 170 while fourth door 62 is shown in partially open position 172 exposing a portion of fourth door opening 48. Therefore, a portion of the air flow may pass through fourth door opening 48 for any of the several useful applications of such passage. The extent of such opening being controllable to control the amount of air flow passing therethrough.

Figure 22:
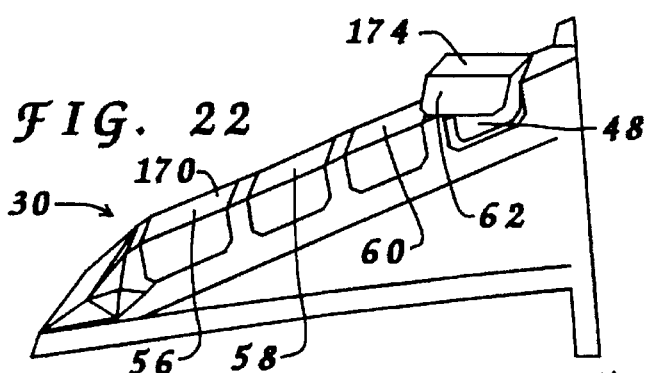

FIG. 22 shows doors 56, 58 and 60 in closed position 170 while fourth door 62 is shown in open position 174 exposing fourth door opening 48. If additional air flow is required an additional select door may be partially or fully opened to provide such required air flow.

Figure 23:
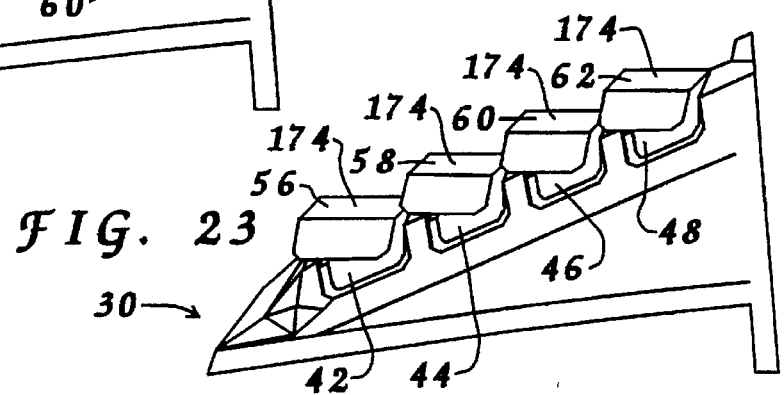

FIG. 23 shows doors 56, 58, 60 and 62 in open position 174 exposing door openings 42, 44, 46 and 48 respectively. In this position air flow may pass through fairing 30 to impinge the trailer, not shown, to exert a braking force.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fairing comprising:
   a) a shell assembly having a plurality of openings therein, each opening bounded by a forward brace with a seating surface and a rearward brace with a door mounting surface, each said brace comprising a plurality of planar surfaces;
   b) a plurality of door panels, each door panel having:
      1) an outer perimeter;
      2) an outer surface;
      3) a plurality of surface areas on the outer surface, each surface area comprised of a planar surface situated thereon, each surface area definable from any adjacent surface areas by a linear juncture therebetween with each planar surface residing on a distinct plane of projection;
   c) door mounting means to provide for hingedly mounting each door panel within a respective opening of the shell assembly;
   d) displacement means to provide for a pivotal displacement of select door panels within their respective openings within the shell assembly;
   e) shell assembly mounting means to provide for attachment of the shell assembly with the doors installed therein to a roof of a tractor.

2. The fairing defined in claim 1 wherein the shell assembly further comprises an outer surface and the outer surface is comprised of a plurality of planar surfaces.

3. The fairing defined in claim 1 wherein the shell assembly is comprised of a single piece unit.

4. The fairing defined in claim 1 further comprising:
   a) a wing member having:
      1) a leading edge;
      2) a trailing edge;
      3) a first surface having a convex shape and extending from the leading edge to the trailing edge;
      4) a second surface comprising:
         a) an opposing convex surface extending from the leading edge on an opposing side from the first surface;
         b) a transition surface being concave shaped;
         c) a concave surface extending from the transition surface to the trailing edge, the transition surface being between the opposing convex surface and the concave surface;
   b) attachment means to provide for elevated placement of the wing member above an attachment surface, the attachment surface an exposed surface of the fairing;
   whereby the wing member is attached to the fairing and provides additional conditioning of the air flow.

5. The fairing defined in claim 1 further comprising:
   a) a right side extender having a plurality of surface sections, the right side extender attached in close proximity to a right rear trailing edge of the shell assembly of the fairing;
   b) a left side extender having a plurality of surface sections, the left side extender attached in close proximity to a left rear trailing edge of the shell assembly of the fairing;
   the right side extender and left side extender to provide for a redirect of air flow to reduce drag.

6. A fairing comprising:
   a) a shell assembly having a plurality of openings therein, each opening bounded by a forward brace with a seating surface and a rearward brace with a door mounting surface, each said brace comprising a plurality of planar surfaces;
   b) a plurality of door panels, each door panel having:
      1) an outer perimeter;
      2) an outer surface surrounded by the outer perimeter;
      3) a plurality of surface areas on the outer surface each having a planar surface situated thereon, each planar surface of each surface area definable from the planar surface of each adjacent surface area by residing on a distinct plane of projection, each surface area having a perimeter comprised of at least three edges;
      4) at least one curved contour situated between one edge of the perimeter and the planar surface;
   c) door mounting means to provide for hingedly mounting each door panel within a respective opening of the shell assembly;
   d) displacement means to provide for a pivotal displacement of select door panels within their respective openings within the shell assembly;
   e) shell assembly mounting means to provide for attachment of the shell assembly with the doors installed therein to a roof of a tractor.

7. The fairing defined in claim 6 wherein the shell assembly further comprises an outer surface and the outer surface is comprised of a plurality of planar surfaces.

8. The fairing defined in claim 6 wherein the shell assembly is comprised of a single piece unit.

9. The fairing defined in claim 6 further comprising:
   a) a wing member having:
      1) a leading edge;
      2) a trailing edge;
      3) a first surface having a convex shape and extending from the leading edge to the trailing edge;
      4) a second surface comprising:
         a) an opposing convex surface extending from the leading edge on an opposing side from the first surface;
         b) a transition surface being concave shaped;
         c) a concave surface extending from the transition surface to the trailing edge, the transition surface being between the opposing convex surface and the concave surface;
   b) attachment means to provide for elevated placement of the wing member above an attachment surface, the attachment surface an exposed surface of the fairing;
   whereby the wing member is attached to the fairing and provides additional conditioning of the air flow.

10. The fairing defined in claim 6 further comprising:
    a) a right side extender having a plurality of surface sections, the right side extender attached in close proximity to a right rear trailing edge of the shell assembly of the fairing;
    b) a left side extender having a plurality of surface sections, the left side extender attached in close proximity to a left rear trailing edge of the shell assembly of the fairing;
    the right side extender and left side extender to provide for a redirect of air flow to reduce drag.

11. A fairing comprising:
    a) a shell assembly having a plurality of openings therein;
    b) a plurality of door panels, each door panel having:
       1) an outer perimeter having a plurality of edges;
       2) an outer surface surrounded by the outer perimeter;
       3) a plurality of surface areas on the outer surface each having a planar surface situated thereon, each planar surface of each surface area definable from the planar surface of each adjacent surface area by residing on a distinct plane of projection, each surface area having a perimeter comprised of at least three edges;
       4) a curved contour situated between each edge of the outer perimeter and the planar surface of each surface area;
    c) door mounting means to provide for hingedly mounting each door panel within a respective opening of the Shell assembly;
    d) displacement means to provide for a pivotal displacement of select door panels within their respective openings within the shell assembly;
    e) shell assembly mounting means to provide for attachment of the shell assembly with the doors installed therein to a roof of a tractor.

12. The fairing defined in claim 11 wherein the shell assembly further comprises an outer surface and the outer surface is comprised of a plurality of planar surfaces.

13. The fairing defined in claim 11 wherein the shell assembly is comprised of a single piece unit.

14. The fairing defined in claim 11 further comprising:
    a) a wing member having:
       1) a leading edge;
       2) a trailing edge;
       3) a first surface having a convex shape and extending from the leading edge to the trailing edge;

4) a second surface comprising:
   a) an opposing convex surface extending from the leading edge on an opposing side from the first surface;
   b) a transition surface being concave shaped;
   c) a concave surface extending from the transition surface to the trailing edge, the transition surface being between the opposing convex surface and the concave surface;
b) attachment means to provide for elevated placement of the wing member above an attachment surface, the attachment surface an exposed surface of the fairing;

whereby the wing member is attached to the fairing and provides additional conditioning of the air flow.

15. The fairing defined in claim 11 further comprising:
   a) a right side extender having a plurality of surface sections, the right side extender attached in close proximity to a right rear trailing edge of the shell assembly of the fairing;
   b) a left side extender having a plurality of surface sections, the left side extender attached in close proximity to a left rear trailing edge of the shell assembly of the fairing;

the right side extender and left side extender to provide for a redirect of air flow to reduce drag.

* * * * *